Dec. 19, 1950 C. W. WALZ 2,534,889
BEET HARVESTER
Original Filed Aug. 26, 1944
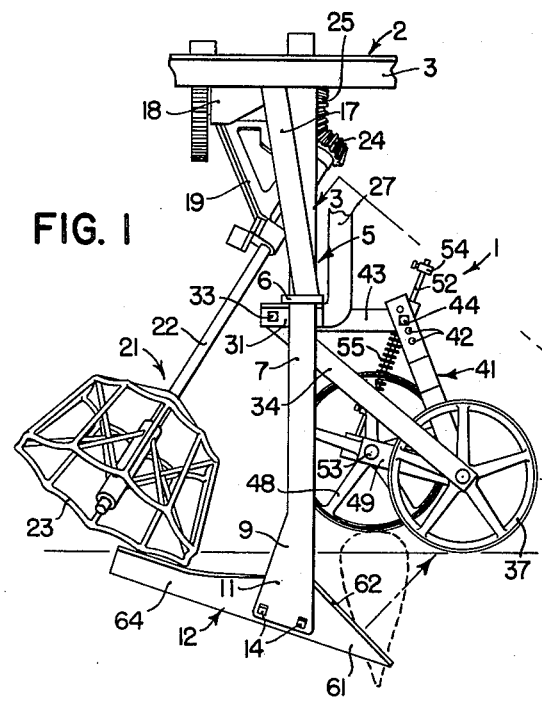
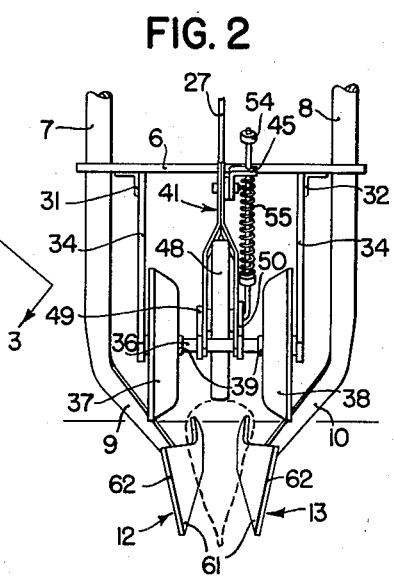
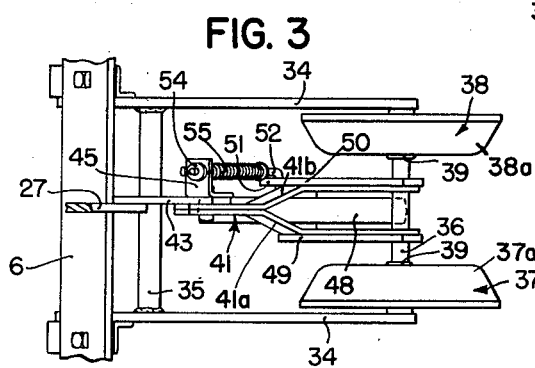
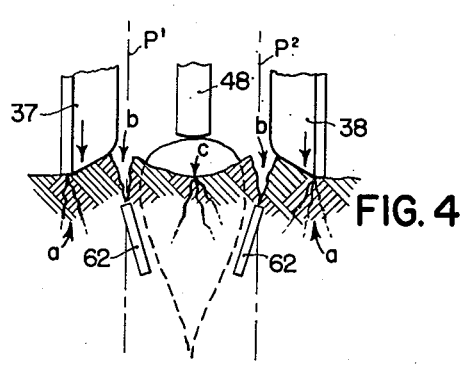
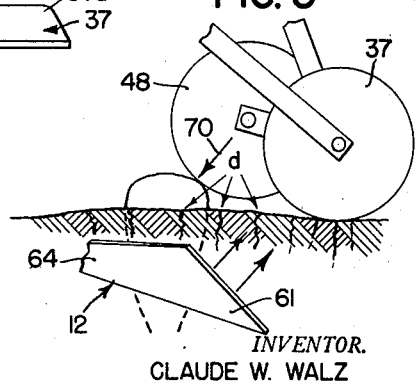
INVENTOR.
CLAUDE W. WALZ
ATTORNEYS Patented Dec. 19, 1950

2,534,889

UNITED STATES PATENT OFFICE 2,534,889

BEET HARVESTER

Claude W. Walz, Rock Island, Ill., assignor to Deere & Company, Moline, Ill., a corporation of Illinois Continuation of application Serial No. 551,359, August 26, 1944. This application July 22, 1947, Serial No. 762,686

20 Claims. (Cl. 55—106)

The present application is a continuation of my co-pending application, Serial No. 551,359, filed August 26, 1944, now abandoned.

The present invention relates generally to agricultural implements and more particularly to harvesting machines, especially those for harvesting root crops and the like.

The object and general nature of the present invention is the provision of a new and improved operating unit for a root crop harvester. More particularly, it is a feature of this invention to provide a new and improved puller unit for sugar beet harvesters. One of the more serious obstacles to complete mechanization of sugar beet growing and harvesting has been the difficulty of mechanical harvesting of sugar beets under soil conditions where there are a considerable number of clods coming through the machine with the beets. Objectionable quantities of clods are usually encountered where the crop has been raised in irrigated soil and where at the time of harvesting the ground is quite hard. Under these conditions the conventional type of beet pulling or lifting unit in operation when lifting the beets breaks up the ground in such a way that the clods formed are about the same size as the beets and, furthermore, are quite hard so that they do not disintegrate readily. As a result, the clods tend to pass through the machine with the beets. In some cases the number of clods actually exceeds the number of beets.

Where cloddy conditions are encountered, several attempts have been made to provide means for eliminating the clods but most of these attempts have been either unsuccessful or have required heavy and complicated machinery. In accordance with the principles of the present invention, I have approached the problem from a different angle, namely, I have provided means which prevents the formation of the clods in the first instance, particularly clods of a size that compares with the size of the beets. Having no clods that approach the size of the beets, the result is that there are no clods passing through the machine with the beets. Specifically, the present invention provides means whereby hard and crusted soils are broken up into pieces or portions much smaller than the beets. Not only does this facilitate the lifting of the beets but, in addition, any soil that adheres to the beets and starts through the harvesting machine with them is entirely eliminated long before the beets reach the delivery end of the harvester.

Specifically, it is a feature of this invention to provide, first, a special type of puller point which, unlike former beet pullers, is shaped so as to exert a substantially directly upward force alongside the beets, and second, means pressing down on the soil at points fairly close to but spaced laterally on opposite sides of the upwardly directed forces resulting from the passage of the puller points through the ground. By virtue of this arrangement, the hard upper crust of the ground is cracked and fractured or broken up into small pieces before any appreciable lifting is performed on the beet. In this way not only is the beet loosened from the surrounding soil but, in addition, the soil is broken up into such small pieces that none can pass through the machine with the beets.

Another important feature of the present invention is the provision of means for exerting a generally rearwardly directed force, relative to the harvester, against the crown of the beet at about the time the puller points become effective on the beet to lift the same from the ground. The object of this improvement is to prevent the puller points from pushing the beet over forwardly, especially where the ground is loosened or fractured prior to the institution of the lifting action.

These and other objects and advantages of the present invention will be apparent to those skilled in the art after a consideration of the following detailed description, taken in conjunction with the accompanying drawings in which the preferred form of the invention has been illustrated.

In the drawings:

Figure 1 is a side view of the pulling unit of a beet harvester, in which the principles of the present invention have been incorporated.

Figure 2 is a front view of the unit shown in Figure 1.

Figure 3 is a view taken generally along the line 3—3 of Figure 1.

Figures 4 and 5 are partly diagrammatic views illustrating the action of the press wheels and associated parts in breaking up the soil and in preventing the beets from being pushed over by the puller points.

Figure 6 is a fragmentary view, somewhat similar to Figure 4, illustrating the manner in which the press wheels, which normally engage the ground close to the line of beets, also serve as means for keeping the puller points on the row.

Referring first to Figures 1 and 2, the beet pulling unit, which is indicated in its entirety by the reference numeral 1, is shown as mounted for generally vertical movement in a beet harvester frame 2 which includes generally longitudinally extending angles 3 and associated parts which, for example, may be substantially like that shown in the co-pending United States application, Serial No. 534, 952, filed May 10, 1944, by Clarence T. Rasmussen, Robert D. Griff and myself, for Beet Harvester, now U. S. Patent 2,463,447, issued March 1, 1949. The beet pulling or lifting unit 1 includes a lifting frame 5 and the latter includes upper and lower cross bars 6 and vertically disposed laterally spaced standards 7 and 8. The lower ends 9 and 10 of the standards are formed to extend laterally inwardly, as best shown in Figure 2, and are flattened, as at 11, to receive puller points or shoes 12 and 13, secured thereto by any suitable means, such as bolts 14.

The lifting frame 5 includes suitable braces 17 and brackets 18 which swingably support carriers 19 in which kicker wheel members 21 are rotatably mounted. The kicker wheel structure is shown in detail in the above-mentioned copending application and need not be described here except to point out that each kicker wheel member 21 includes a shaft 22 journaled for rotation in the associated member 19, and each kicker wheel shaft 22 carries at its lower end a kicker wheel 23 and at its upper end a pinion 24 with which a gear 25 meshes. The gear 25 is driven by mechanism (not shown) and serves to rotate the kicker wheels 23. The lifting frame 5 may be raised and lowered by a lifting connection with a vertical arm 27 connected to the lower cross bar 6.

Also secured to the cross bar 6, adjacent the standards 7 and 8, is a pair of supporting angles 31 and 32, and pivoted, as at 33, to the rear end of each of the angles 31 and 32 is the rear upper end of a downwardly and forwardly extending arm 34. The lower ends of the arms 34 are apertured, as best shown in Figure 2, to receive an axle shaft 36 on which a pair of ground engaging press wheels 37 and 38 are mounted. The arms 34 are connected rigidly by a brace 35 welded thereto. The wheels 37 and 38 are held adjacent the arms 34 by collars 39 or other suitable means, and centrally the axle shaft 36 is connected by a strut 41, which has a plurality of openings 42 in the upper end thereof, to a forwardly extending bar 43 by a removable bolt 44. This bolt 44 also connects a bracket 45 to the arm 43. The strut 41 is made up of a pair of straps 41a and 41b (Figure 3) which at their lower ends are spaced apart, as best shown in Figure 2, so as to clear a center wheel 48 which is swingably mounted by means of a pair of bars 49 and 50 which at their forward ends are apertured to receive the axle shaft 36 and at their rear ends are apertured to receive a shaft 55 on which the center wheel 48 is rotatably mounted. The bar 50 is extended rearwardly, as at 51 (Figure 3), and is apertured to receive the lower end of a pressure rod 52 about which a spring 53 is disposed. The upper end of the spring 53 bears against the bracket 45, and the upper end of the pressure rod 52 is extended upwardly through an opening in the bracket 45 and at its upper end receives a stop collar 54 which limits the permissive downward movement of the center wheel 48. As best shown in Figure 3, the forwardly extending arm 43 is bolted rigidly to the lower end of the lifting arm 27, and when the bolt 44 is placed in one of the openings 42, the press wheels 37 and 38 are connected rigidly with the pulling unit frame 5 while the center wheel 48 is capable of vertical swinging with respect thereto, restrained by the spring 53.

In order best to carry out the purposes of the present invention, the puller points 12 and 13 are specially formed. In the first place, the flattened sections 11 of the standards 7 and 8 are disposed nearly vertical, and the puller points 12 and 13 preferably are formed of substantially flat stock. Each puller point is formed with a substantially vertical front end 61 having a forwardly and upwardly facing edge 62. The rear section 64 of each puller point converges rearwardly and upwardly and, in effect, constitutes the active portion of the puller points so far as actually lifting the beet from the ground is concerned. The front portions 61 of the puller points 12 and 13 constitute, in effect, the ground breaking sections of the pulling unit, as will be more clearly understood from the following description of the operation of my new and improved pulling unit.

In operation, the unit 1 is lowered through suitable connections with the lifting link 27 until the points 12 and 13 operate under the ground surface, as shown in Figure 1. Preferably, the tail or lifting section 64 of each puller point substantially emerges from the ground and is disposed in such a position that beets in this zone are readily engaged by the kicker wheels 23. As the machine is propelled down a row of beets the press wheels 37 and 38 run along the ground at each side of the beet row, as best shown in Figure 4, while the center wheel 48 passes along the center of the row and contacts the ground between the beets but rides over the crowns of the beets during the progress of the machine, as shown in Figure 1. Referring now to Figures 2 and 4, it will be seen that the press wheels 37 and 38 are spaced apart laterally outside the generally vertical planes $P^1$ and $P^2$ of the puller points 12 and 13, particularly the forward portions 61 thereof. It will be noted, particularly from Figure 4, that the press wheels 37 and 38 engage the surface of the ground outside the puller point plane $P^1$ and $P^2$, at a distance therefrom substantially the same as the distance from the center of the row outwardly to the puller point plane, $P^1$ or $P^2$. Since the forwardly and upwardly facing edges 62 are disposed substantially vertically, the first effect of these portions of the puller points is to force the ground upwardly. However, the press wheels 37 and 38, contacting the ground as shown in Figure 4, serve as reaction or anchoring points, and likewise the center wheel 48, engaging either the center of the row between the beets or pressing directly downwardly on a beet, serves also as an anchoring point, preventing the adjacent portions of the ground from being forced upwardly. However, the upward force due to the inclined or angled edges 62 results in fracturing the ground surface at the zones $a$, $b$, and $c$ (Figure 4). There is a natural tendency for the ground to crack down the middle of the row, due probably to the growth of the beets, and since the upwardly directed forces against the ground crust due to the angle of the edges 62 come approximately half-way between the center of the row and the path of travel of the press wheels 37 and 38, it will be seen that the soil is fractured or broken up into relatively small pieces, substantially smaller than the beets themselves. In order best to effect this action, the press wheels 37 and 38 are not only placed fairly close to the beets (see Figure 4), but also the press wheels 37 and 38 are disposed in a longitudinal direction substantially directly above the front ends of the puller points 12 and 13, and particularly, the wheels 37 and 38 engage the ground at a point such that a line from that point to the edges 62 is substantially normal or perpendicular to the latter, as best shown in Figure 5. This particular arrangement assures that the crusted ground surface will be broken up into small pieces, smaller than beets. The edges 62 are of such length, however, that lines of pressure, extending upwardly and forwardly perpendicularly therefrom, pass rearwardly of the wheels 37 and 38, and in the space longitudinally between the wheels 37 and 38 and the rear wheel 48. Thus, the ground surface is broken in lateral zones $d$ by the passage of the puller points, both when the wheel 48 engages the ground directly and when the wheel 48 rides over a beet, as shown in Figure 5, the puller points 12 and 13 thus serving as ground breaking means.

The center press wheel 48 is arranged to perform an additional function, other than having to do with breaking up the surface crust. As best shown in Figure 5, when the puller progresses to a point where the rearwardly and upwardly converging sections 64 of the puller points start to act on the beet, the wheel 48 engages the forward portion of the beet and, in effect, as indicated by the arrow 70, exerts a generally rearwardly directed force against the beet. This has the important advantage of preventing the forward motion of the puller points, particularly the rear portions 65 thereof, from pushing over the beet forwardly, such action being opposed by the relative rearward action of the spring pressed wheel 48 against the crown of the beet. The wheel 48 may therefore be considered as means which prevents the beet from being overturned by the forward push which the rear portions of the puller points tend to exert thereon. The combination of this action in holding the beet against being overturned forwardly while at the same time forcing the beet upwardly from the fractured soil with the upward force exerted by the points on the beet results in lifting the beet substantially directly upwardly, thus providing an easy and effective separation of the beet from the soil and materially facilitates the engagement of the lifted beet by the kicker wheels 23. The aforesaid improved lifting action is materially facilitated by the action of my new and improved pulling unit, as described above, in breaking up hard or crusted ground into such small particles or portions that there are no clods formed that would tend to pass through the machine with the beets. Therefore, the necessity for adding clod separating mechanism to the harvesting mechanism is entirely eliminated.

The pressure wheels 37 and 38 are also adapted to perform another function that, under certain conditions, is quite important. These wheels, being quite close to the beets, and also having laterally inwardly facing, approximately conical non-cutting tread sections 37a and 38a (Figure 3), cooperate with the beets to act as guides for holding the puller unit on the row. This is particularly true where the beets are fairly large and project a considerable distance above the ground surface. Under certain conditions, it may be desirable to entirely remove the center wheel 48. However, where the beets are fairly large, this did not materially reduce the desired action of the pressure wheels and points in breaking up the ground into small pieces because, as mentioned above, there is a natural tendency, due to the growing and increasing size of the beets during the growing season, to crack the ground along the center of the row, and if the beets are fairly large, the points 12 and 13 are capable of lifting the beets into a position where they may be engaged by the kicker wheels 23, notwithstanding the fact that the wheel 48 and its function of pushing relatively rearwardly on the crowns of the beets are omitted.

The wheels 37 and 38 are also adapted to hold the puller unit on the row by cooperating with the edges or side walls formed by the rolling colters and jointers that in most cases are used ahead of the pulling unit. The rolling colters and jointers are not shown in the present case but are shown in the co-pending United States application, Serial No. 485,527, filed May 3, 1943 by Clarence T. Rasmussen, Howard F. Clausen, and myself, now U. S. Patent 2,433,799, issued December 30, 1947. This action is illustrated in Figure 6 in which the ground surface is indicated by the reference numeral G and the edges or side walls formed by the rolling colters and jointers are indicated by the reference characters E. In operation, the edges or side walls E are formed by the rolling colters while the jointers throw the soil laterally outwardly away from the row, thus forming a path along which the wheels 37 and 38 may move, being guided by the ridge of soil between the side walls E, as illustrated.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A beet puller unit for beet harvesters and the like, comprising support means, a pair of laterally spaced puller points carried by said support means and adapted to be propelled along a row with the points under the ground surface and passing adjacent the beets in the row, a pair of press wheels spaced apart laterally and disposed substantially over the front end of said points, means connecting said press wheels with said support means whereby said press wheels are disposed in vertical planes closely adjacent but outside of the vertical planes of said puller points, and a central spring mounted wheel connected with said support means and disposed rearwardly of said press wheels and arranged to prevent the beet from being forced out of the ground by the front ends of the puller points as the latter move down a row of beets, and means rearwardly of said central wheel for lifting said beet.

2. A beet puller unit for beet harvesters and the like, comprising a pair of laterally spaced standards, each having at its lower end a puller point and the forward end of each point being disposed generally vertically and having a rearwardly and upwardly extending edge, the rear portion of each of said puller points having a rearwardly and upwardly extending beet lifting section, and a pair of press wheels spaced apart laterally and adapted to engage the ground at points laterally outwardly of said puller points, said wheels being spaced slightly forwardly of the front ends of said points whereby a line extending from the point at which each wheel contacts the ground to the associated puller point lies substantially perpendicular to said edge.

3. In a puller unit for beet harvesters and the like, frame means, a pair of laterally spaced puller points carried by said frame means, means carried by said frame means generally centrally with respect to said points and engageable with the beets and the ground in a row between the beets for holding the beets down as the points pass along the beets, and means carried by said frame means for pressing downwardly on the ground laterally outwardly of said points but substantially over the latter, whereby the soil is broken up into pieces smaller than the beet.

4. In a beet harvester or the like, a beet puller unit comprising a pair of laterally spaced standards, a pair of puller points fixed to the lower ends respectively of said standards, and three laterally spaced press wheels carried by said standards, the center press wheel being disposed substantially midway between the laterally outer wheels and adapted to run along the beets and the ground in the row between the beets, and two laterally outer wheels being adapted to press down against the ground surface at distances laterally outwardly of the vertical planes of said points, said distances being such that said planes of said points passing substantially midway between the laterally outer wheels and the center wheel, whereby said wheels in preventing the ground from being pushed upwardly by the forward passage of the points serve to cause the points to crack the ground surface at points substantially midway between the planes of said wheels, the downward pressure of said wheels thus serving as points of reaction whereby the ground surface also tends to crack underneath and between said wheels.

5. A beet puller unit comprising a pair of laterally spaced standards, a pair of laterally spaced puller points fixed to the lower ends, respectively, of said standards, a pair of arms connected rigidly with said standards, a pair of laterally spaced ground engaging wheels rotatably mounted on said arms and disposed substantially directly above the forward ends of said points, a center wheel disposed substantially midway between the planes of said first mentioned wheels and swingably connected with said standards, and spring means acting against said swingable wheel for resiliently urging the same downwardly.

6. The invention set forth in claim 5, further characterized by said wheels being spaced apart laterally such that the generally vertical planes of said puller points pass substantially midway between the center wheel and the two laterally outer wheels.

7. In a beet puller unit, a pair of laterally spaced puller point standards, downwardly and forwardly extending arms rigidly carried thereby, a pair of laterally spaced ground engaging wheels rotatably carried by said arms, and a spring biased swingably mounted center wheel movably carried by said standards and disposed in a position substantially midway between said first mentioned wheels.

8. A beet pulling unit comprising a mobile support, a pair of ground engaging wheels connected with said mobile support in laterally spaced apart relation and adapted to traverse the ground at each side of the row of beets, a yieldably mounted center wheel connected with said support in a position to pass along the center of the row and to ride over the beets, and ground breaking means carried by said mobile support and adapted to be propelled along the row underneath the surface of the ground and to force the soil generally upwardly against said wheels in order to crack the ground into relatively small portions adjacent the beets.

9. A beet pulling unit comprising a mobile support, a pair of ground engaging wheels carried by said support in laterally spaced apart relation and adapted to traverse the ground at each side of the row of beets, a center wheel adapted to pass along the center of the row and to ride over the beets, means yieldably connecting said center wheel with said mobile support, ground breaking means carried by said mobile support and adapted to be propelled along the row underneath the surface of the ground and to force the soil generally upwardly against said wheels in order to crack the ground into relatively small portions adjacent the beets, and means connected with said mobile support and disposed rearwardly of said soil lifting means for lifting the beets out of the fractured portions of the soil.

10. A beet puller comprising a pair of standards carrying puller points at the lower ends thereof, a swingably mounted press wheel swingably connected with said standards and positioned to pass along the center of the row and to run over the crowns of the beets while the latter are in the ground, and spring means for pressing said wheel downwardly, said wheel being disposed in a fore and aft direction relative to said puller points in a position such that the wheel tends to exert a generally rearwardly directed force, relative to the standards, against the crown of each beet as the latter is lifted by said points, whereby to offset the tendency of said points to overturn said beets in a forward direction.

11. A beet pulling unit comprising a mobile support, a pair of soil penetrating points carried by said support and spaced apart laterally so as to be passed along a row of beets to be lifted, said points being formed so as to exert a generally upwardly and forwardly directed force against the beets, beet engaging means disposed generally centrally with respect to the generally vertical planes of said points, and means connecting said central beet engaging means with said mobile support in a position sufficiently forward with respect to said points so that said beet engaging means engages the crowns of the beets and presses them generally downwardly and rearwardly, thereby opposing the generally forwardly directed component of force directed against the beets by the forward movement of said points.

12. In a beet puller unit for beet harvesters and the like, a mobile support, a pair of puller points carried thereby in laterally spaced apart relation, each point having a portion adapted to pass underneath the ground surface and to press generally upwardly against the overlying soil, and means carried by said support generally centrally between the planes of said points for pressing downwardly on the surface of the soil between the beets generally longitudinally of the row for breaking up the ground surface into pieces smaller than a beet.

13. A beet puller unit for beet harvesters and the like, comprising a pair of puller points spaced apart laterally to receive beets therebetween, and a pair of laterally spaced guide wheels having laterally inwardly facing approximately conical non-cutting tread sections rounded at their laterally inner edges so as to engage without damage the crowns of the beets for holding the puller unit on the row.

14. A beet puller unit for beet harvesters and the like, comprising a pair of laterally spaced puller points, each having a forward edge that is disposed approximately vertically and extending generally upwardly and rearwardly, and a pair of press wheels spaced apart laterally and adapted to engage the ground at points laterally outwardly of said puller points, said wheels being spaced slightly forwardly of the front ends of said points whereby a line extending from the point of ground contact of each wheel to the associated puller point lies substantially perpendicular to said edge.

15. A beet puller unit comprising a mobile support, a pair of laterally spaced apart puller points carried thereby, a pair of laterally spaced ground engaging wheels carried by said support and disposed substantially directly above the forward ends of said puller points, a center wheel disposed substantially midway between the planes of said first mentioned wheels, means swingably connected said center wheel with said support, and spring means acting against said swingable wheel for resiliently urging the same downwardly.

16. A beet puller comprising a mobile support, a pair of laterally spaced puller points carried by said mobile support, a swingably mounted beet engaging part swingably connected with said mobile support and positioned to pass along the center of the row and to run over the crowns of the beets while the latter are in the ground, and spring means acting between said mobile support and said swingably mounted part for pressing the latter downwardly, said part being disposed in a fore and aft direction relative to said pulling points in a position such that said part tends to exert a generally rearwardly directed force relative to the mobile support against the crown of each beet as the latter is lifted by said points, whereby to offset the tendency of said points to overturn said beets in a forward direction.

17. A beet puller unit for beet harvesters and the like, comprising support means, a pair of laterally spaced puller points carried by said support means and adapted to be propelled along a row with the points under the ground surface and passing adjacent the beets in the row, a pair of press wheels spaced apart laterally and disposed adjacent said points, means connecting said press wheels with said support means whereby said press wheels are disposed in vertical planes closely adjacent but outside of the vertical planes of said points, and a central spring mounted wheel connected with said support means and disposed generally above said puller points and adjacent the latter so as to prevent the beets from being forced out of the ground by the puller points as the latter move down a row of beets, and means rearwardly of said central wheel for engaging and lifting said beet.

18. In a puller unit for beet harvesters and the like, frame means, a pair of laterally spaced puller points carried by said frame means, means carried by said frame generally centrally with respect to said points and engageable with the beets and the ground in a row between the beets for holding the beets down as the points pass along the beets, and a pair of laterally spaced soil engaging wheels carried by said frame means in a position to press against the soil and aid in the separation of the beets from the soil during the passage of the beets through the machine.

19. In a beet puller unit, a pair of laterally spaced puller point standards, arms rigidly carried thereby, a pair of laterally spaced ground engaging wheels rotatably carried by said arms, and a spring biased swingably mounted center wheel movably carried by said standards and disposed in a position substantially midway between said first mentioned wheels.

20. A beet puller unit comprising a mobile support, a pair of laterally spaced apart puller points carried thereby, a pair of laterally spaced ground engaging wheels carried by said support and disposed generally above said puller points, a center wheel disposed substantially midway between the planes of said first mentioned wheels, means swingably connecting said center wheel with said support, and spring means acting against said swingable wheel for resiliently urging the same downwardly.

CLAUDE W. WALZ.

REFERENCES CITED

The following references are of record in the file of this patent:

UNITED STATES PATENTS

| Number | Name | Date |
|---|---|---|
| 2,050,454 | Ader et al. | Aug. 11, 1936 |
| 2,249,637 | Reitz | July 15, 1941 |
| 2,338,222 | Zuckerman | Jan. 4, 1944 |
| 2,452,418 | Zuckerman | Oct. 26, 1948 |

FOREIGN PATENTS

| Number | Country | Date |
|---|---|---|
| 4,861 | Austria | Aug. 10, 1901 |